June 18, 1935. A. FLUKES 2,005,258
REFRIGERATION
Filed Feb. 8, 1934
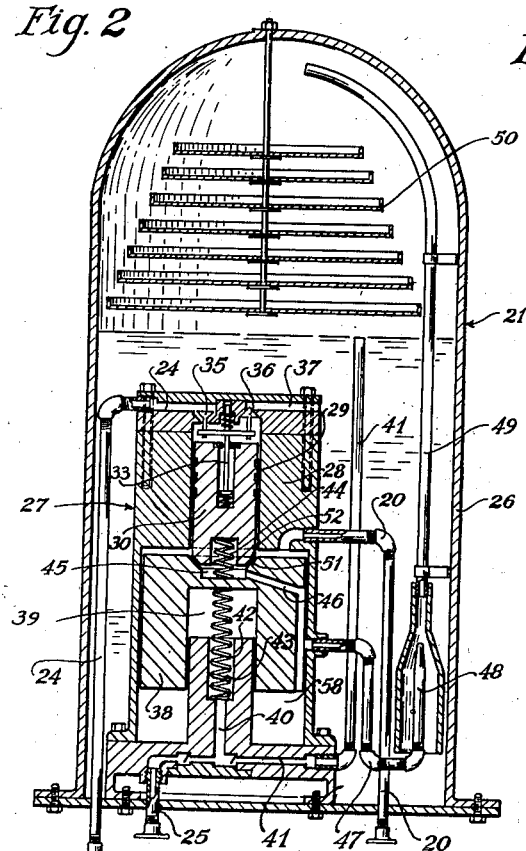
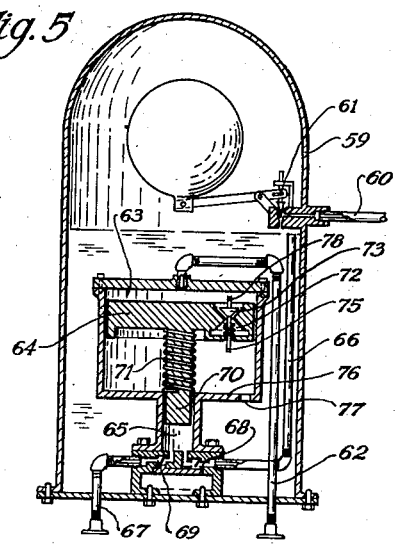
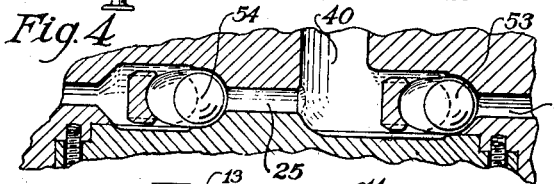
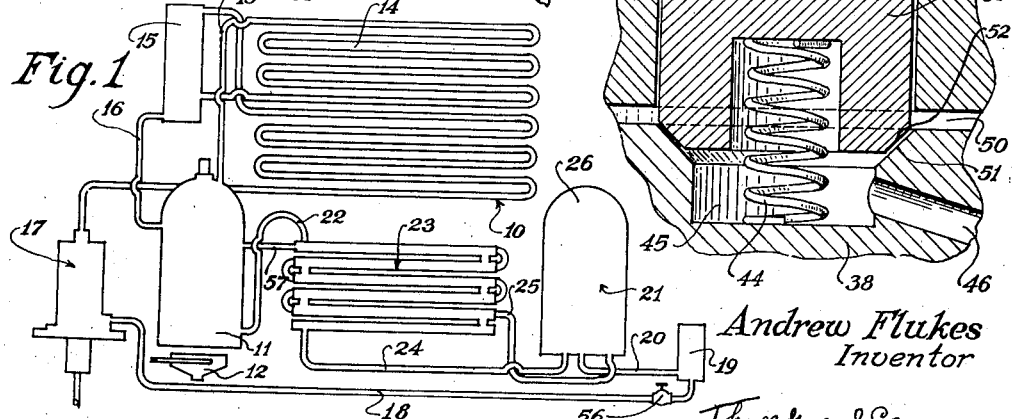
Andrew Flukes
Inventor Patented June 18, 1935

2,005,258

UNITED STATES PATENT OFFICE 2,005,258

REFRIGERATION

Andrew Flukes, Chicago, Ill., assignor of one-third to Elmer L. Ballew, and one-third to Marty Bloom, Chicago, Ill.

Application February 8, 1934, Serial No. 710,201

10 Claims. (Cl. 62—5)

This invention relates to refrigeration.

It is an object of this invention to provide an improved refrigeration apparatus which is relatively simple and inexpensive in construction and efficient in use.

Another object of the invention is to provide a refrigerating apparatus which eliminates the customary motor for operating the pump that forces the relatively strong refrigerant solution from the absorber to the generator; the present apparatus providing for this purpose a pump that is operated by pressures of the refrigerant in its gaseous and liquid phases in the refrigerating system itself without the application of external energy except that which is applied to the generator.

A further object of the invention is to provide a novel pump for forcing the relatively strong refrigerant solution from the absorber to the generator.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a diagrammatic view illustrating the combination embodied in the present apparatus;

Fig. 2 is a vertical sectional view of the new absorber unit which includes an absorption tank and a preferred form of the new pump therein;

Fig. 3 is an enlarged sectional detail view of a preferred form of the new pump that is embodied in the present apparatus;

Fig. 4 is an enlarged sectional detail view of a valve arrangement associated with the pump; and Fig. 5 is a sectional detail view of a modified form of pump.

The present invention comprises a combination of elements which constitute a refrigerating system, a preferred form of which is illustrated in Fig. 1 and generally indicated therein at 10.

The refrigerating system or unit 10 comprises a generator 11 with which is associated a heating element 12 of any suitable type such, for example, as a gas, steam, or electric heater or the like. The generator 11 communicates at its upper end, by way of a conduit 13, with the condenser 14 in series with which is arranged a rectifier 15 that drains back into the upper area of the generator 11 by way of a bleed pipe 16.

The condenser 14 communicates with a suitable and conventional float control device 17 by which the flow of energy or fuel to the heater 12 is controlled so as to stop and start the refrigerating unit automatically. This control device 17 receives the refrigerant such, for example, as liquid ammonia from the condenser 14 and is operated thereby through a conventional float control (not shown). A conduit 18 leads from the float control 17 to the evaporator 19 which, in turn, communicates by way of a conduit 20 with the absorber unit, generally indicated at 21 and including an absorption tank 26.

The lower area of the generator 11 communicates, by way of a conduit 22 with a heat exchanger 23 and the latter communicates, by way of pipes 24 and 25, with the absorber unit 21.

Arranged in the absorber tank 26 is the new pumping unit, generally indicated at 27 and comprising a body 28 in which is provided a cylinder 29. Operable in the cylinder 29 is a piston 30 in the upper portion of which is provided a recess 31 housing a spring 32. This spring 32 bears against the lower end of a valve stem 33 which is slidably mounted in the recess 31 and bears the valve stem 33 upwardly.

Carried by the valve stem 33 is a cross arm 34 which operates in the upper area of the cylinder 29 (Fig. 3), and this cross arm 34 carries a pair of oppositely arranged valves 35 and 36. The valve 35 controls communication between the conduit 24 and the upper area of the cylinder 29 and the valve 36 controls communication between the upper area of the cylinder 29 and an outlet 37 therefrom into the absorber tank 26.

Slidably mounted in the pump body 28 below the piston 30 is a combination piston-cylinder 38 having a cylindrical recess 39 formed therein. Leading into the cylinder 39 is a fluid passage 40, formed in the pump body 28, and this passage 40 communicates by way of a vertical pipe 41 with the interior of the absorber tank 26, the pipe 41 opening at its upper end at approximately the upper level of the liquid (Fig. 2) in the absorber tank 26. Communicating with the passage 40 is the fluid outlet conduit 25.

The fluid passage 40 communicates with the cylinder 39 by way of a recess 42 formed in the pump body 28 and seated in this recess 42 is a spring 43 which urges the piston-cylinder 38 upwardly. A spring 44 is arranged between the piston 30 and the piston-cylinder 38 and urges the same apart.

Formed in the upper portion of the piston-cylinder 38 is a recess 45 and also formed in the pump-cylinder 38 in communication with the recess 45 is a passage 46 which communicates exteriorly of the piston-cylinder 38 with a conduit 47 that terminates in a nozzle or ejector 48. This nozzle or ejector 48 leads into a vertical pipe 49 which opens at its upper end in the upper area of the absorption tank 26 so as to allow the liquid refrigerating medium that emerges therefrom to trickle down over a bank of baffle plates 50 into the absorption tank 26.

A tapered valve seat 51 is formed in the upper portion of the piston-cylinder 38 and a correspondingly tapered valve head 52 is formed in the lower portion of the piston 30.

Arranged at the juncture between the inlet conduit 41 (Fig. 4) and the passage 40 is a check valve 53 and arranged in the outlet 25 from the passage 40, adjacent the latter, is a check valve 54.

Operation

An object of the invention and of the new apparatus is to transfer the relatively strong refrigerant, or refrigerating liquor such, for example, as a water solution of ammonia, from the absorber tank 26 back to the generator 11 by means of the pumping unit 27 without the use of a motor to operate the pumping unit, the same being operated by potential energy or pressure differences present in the system itself.

To this end the gas driven out of the refrigerant solution or liquor in the generator 11, by operation of the heating unit 12, passes from the upper area of the generator 11 into the rectifier 15 wherein the moisture carried by the gaseous refrigerant is condensed and fed back into the generator by way of the bleed pipe 16.

From the rectifier 15 the gaseous refrigerant passes into the condenser 14 wherein heat is extracted from the gaseous refrigerant, thereby condensing the same to a liquid which flows through the receiver and fuel control device 17, and thence by way of the conduit 18 and a suitable expansion valve 56 to the evaporator 19 whereby the gaseous refrigerant in the solution of the same is caused to evaporate and passes from the evaporator by way of the conduit 20 to the absorber 21.

The relatively weak refrigerant solution or liquor passes from the bottom area of the generator by way of the conduit 22 into the upper area of the heat exchanger 23 and, in turn, passes from the lower area of the heat exchanger 23 by way of the conduit 24 into the absorber 21; whereas the relatively strong refrigerant solution passes from the absorber 21 by way of the conduit 25 into the lower area of the heat exchanger 23 and, in turn, passes from the upper area of the latter by way of the conduit 57 into the generator 11. The relatively weak refrigerant solution or liquor emerging from the generator has a relatively high temperature whereas the relatively strong refrigerant solution or liquor entering the generator has a relatively low temperature, and the heat exchanger 23 functions to raise the temperature of the relatively strong liquor entering the generator while at the same time, by heat exchange, lowering the temperature of the relatively weak liquor flowing out of the generator.

By reference to the drawing it will be noted that the relatively weak refrigerant solution or liquid, after passing from the generator through the heat exchanger 23, enters the absorber 21 by way of the conduit 24 while at the same time the refrigerant gas passes from the evaporator 19 into the absorber 21 by way of the conduit 20. From the conduit 20 the gas from the evaporator flows into the cylinder 58 above the piston 38 and thence passes by the valve 51—52 through the recess 45 into the passage 46 and 47 and thence by way of the nozzle or ejector 48 into the ejector outlet pipe 49 whereby the liquor in the absorber is ejected from the pipe 49 into the upper area of the absorber tank 26 where it trickles down over the baffle plates 50 to complete the absorption process; it being understood that pistons 30 and 38 are normally slightly separated by the spring 44 so as to open the valve 51—52 and permit the gas from the evaporator 19 and conduit 20 to flow past the valve 51—52 into the passage 46 and thence into the ejector 48—49.

The refrigerant solution or liquor in the absorption tank 26 normally stands at the height indicated in Fig. 2 whereby the liquid runs down the conduit 41 past the check valve 53 (Fig. 4), through the passages 41 and 40 into the cylindrical area 39 of the piston-cylinder 38 which is thus kept filled and is prevented from emptying by the check valve 54. The pressure of the refrigerant gas, from the evaporator 19 and conduit 20, upon the pump piston 38 is at all times insufficient of itself to drive the piston 38 down against the resistance of the spring 43 and liquid in the area 39. However, the pressure of the gas from the line 20 upon the head of the piston 38 cooperates with, or is added to, the pressure of the refrigerant liquid in the line 24 so as to force the pump piston 38 downwardly and thereby force the relatively strong liquid refrigerant solution from the absorber 21 by way of the cylinder 39, passages 40 and 25, valve 54, conduit 25, heat exchanger 23 and conduit 57 into the generator 11.

The liquid refrigerant solution entering the conduit 24 passes by the normally open valve 35 into the upper area of the cylinder 29, above the piston 30, and upon filling this area, forces the piston 30 down against the resistance of the spring 44. This downward movement of the piston 30 causes the valve head 52 formed in the bottom of the piston 30 to engage its seat 51, thereby cutting off the flow of gas from the conduit 20 past the valve 51—52 and thus causing the pressure of the gas from the line 20 to exert itself upon the head of the piston-cylinder 38. Thereupon the pressure of the gaseous refrigerant from the conduit 20 upon the head of the piston-cylinder 38, combined with the pressure of the liquid refrigerant from the conduit 24 upon the piston 30, overcomes the resistance of the liquid refrigerant in the cylindrical area 39 of the piston-cylinder 38 and the resistance of the spring 43, thereby causing the piston 30 and the piston-cylinder 38 to move down in unison whereupon the piston-cylinder 38 forces the relatively strong refrigerant solution out of the cylindrical area 39 of the piston-cylinder 38, through the passages 40 and 25, past the check valve 54, and thence through the conduit 25, heat exchanger 23, and conduit 57 into the upper area of the generator 11.

As the piston 30 approaches the lower end of its downward stroke a flange 60 provided on the piston 30 engages a flange 59 on the valve stem 33 and pulls the valve stem downwardly, whereupon the compression spring 55 (Fig. 3) slides the cross arm 34 downwardly upon the valve stem 33, thereby opening the valve 36 and closing the valve 35 and thus cutting off the pressure of the liquid refrigerant from the conduit 24 upon the head of the piston 30. Thereupon the force of the tensioned spring 43, being greater than the pressure of the gaseous refrigerant from the conduit 20 upon the head of the piston-cylinder 38, forces the latter upwardly.

During the first part of the upward stroke of the piston-cylinder 38 and piston 30 the valve 35 remains closed and the valve 36 remains open and the piston 30 forces the liquid refrigerant in the upper area of the cylinder 29, above the piston 30, out through the valve 36 into the passage 37 and thence into the liquid refrigerant in the absorption tank 26.

As the piston 30 and the piston-cylinder 38 move upwardly the check valve 54 closes and the check valve 53 opens and a new charge of the liquid refrigerant from the absorption tank 26 is thus drawn into the cylindrical area 39 of the piston-cylinder 38 by way of the intake conduit 41 and check valve 53.

At the end of the downward stroke of the piston 30 and the piston-cylinder 38 the tensioned spring 44 separates the piston 30 and the piston-cylinder 38 slightly, thereby opening the valve 52—51 and thus cutting off the pressure of the gaseous refrigerant from the conduit 20 upon the head of the piston-cylinder 38 whereupon the tensioned spring 42 urges the piston-cylinder 38 and the piston 30 upwardly. During this upward stroke of the piston 30 and the piston-cylinder 38 the tensioned spring 32 urges the valve stem 33 and its cross arm 34 upwardly, thereby opening the valve 35 and closing the valve 36, whereupon the aforementioned cycle of pumping operations commences over again, reestablishing communication between the conduit 20 and the by-pass passage 46 to the ejector 48—49.

It is to be noted that the area of the head or upper surface of the piston-cylinder 38 is considerably greater than the cross sectional area of the cylinder 39 so that the total force in pounds of the gaseous refrigerant from the conduit 20 acting downwardly upon the piston-cylinder 38 is approximately equal to the gas pressure in pounds per square inch in the conduit 20 multiplied by the area in square inches of the top surface or head of the piston-cylinder 38. It is because of this fact that the total downward force of the gaseous refrigerant from the conduit 20 upon the head of the piston-cylinder 38, plus the force of the liquid from the line 24 upon the piston 30 will overcome the combined resistance of the spring 43 and the liquid in the area 39 so as to force the relatively strong solution out of the area 39 through the line 40—25—54—23—57 to the generator 11.

A modified form of pumping unit is shown in Fig. 5 and may be substituted in the absorption tank 26 for the unit 27. In this modification of the invention the absorption tank is indicated at 59 and has a conduit 60 opening into its upper area, above the liquid level therein. This conduit 60 corresponds to the conduit 24 and conducts the relatively weak liquid refrigerant solution from the heat exchanger into the absorber; the flow from the conduit 60 into the absorption tank 59 being governed by a conventional float-controlled valve 61 arranged in the absorber tank 51.

Leading into the absorber tank 59 is a gas-conducting conduit 62, which corresponds to the conduit 20, and conducts the refrigerant gas from the evaporator into a cylinder 63 that is arranged in the absorption tank 59. The conduit 62 opens into the area of the cylinder 63 above a piston 64 arranged in the latter. The cylinder 63 has a reduced lower end portion 65 into which opens a pipe 66 that is similar to the pipe 49. Leading out of the cylinder area 65 is a conduit 67 which corresponds to the conduit 25; inflow from the conduit 66 and outflow through the conduit 67 being governed by suitable check valves 68 and 69.

The piston 64 has a reduced portion 70 which operates in the cylinder area 65 to force the relatively strong refrigerant liquor therefrom out through the conduit 67 to the heat exchanger and generator; the piston 64 being lifted by a spring 71 wound upon the reduced portion 70 of the piston 64.

Extending vertically through the piston 64 is a passage 72 which is governed by a valve 73, which is carried by the piston 64 and has a stem projecting below the piston 64.

When the piston 64 reaches the lower end of its stroke the valve stem 75 engages the bottom wall 76 of the cylinder 63, thereby unseating the valve 73 and allowing the gaseous refrigerant from the conduit 62 to flow through the valve passage 72 and the cylinder 63 out through the port 77, that is formed in the bottom wall 76 of the cylinder 63, into the liquid refrigerant in the absorption tank 59.

When the piston 64 upon its return stroke approaches the upper limit of its travel the upper portion 78 of the valve stem 75 engages the top wall of the cylinder 63 and thereby seats the valve 73, thus cutting off the flow of the gaseous refrigerant from the conduit 62 through the passage 72 in the piston 64, whereupon the piston 64 is again forced down and the aforementioned cycle of operations commences over again.

The arrangement of the pumping unit in the absorption tank has a number of advantages among which are that this arrangement makes for compactness and causes the pump to be lubricated by the liquid refrigerant in which it is immersed, thereby dispensing with the need for other lubrication.

While I have illustrated and described the preferred form of construction for carrying my invention into effect, this is capable of variation and modification, without departing from the spirit of the invention. I, therefore, do not wish to be limited to the precised details of construction set forth, but desire to avail myself of such variations and modifications as come within the scope of the appended claims.

Having thus described my invention what I claim as new and desire to protect by Letters Patent is:

1. In a refrigerating apparatus, the combination of: a generator; an absorber; an evaporator; a pump comprising a body having coaxial, interconnecting cylinders one of which is provided at its head end with an inlet for the relatively weak liquid refrigerant solution flowing from the generator into the absorber; the other of said cylinders having an inlet at its head end for the gaseous refrigerant flowing from the evaporator into the absorber; a piston in the first-named cylinder and a piston-cylinder in the second-named cylinder having a cylinder portion provided with a passage functioning as an inlet thereinto for the relatively strong liquid refrigerant solution from the absorber and also as an outlet for the same to the generator; said piston-cylinder having a by-pass passage formed therein opening at one end upon the upper surface of the same and at its other end upon the external surface thereof; and a valve between the said piston and piston-cylinder opening said passage in the idle position of the parts so as to by-pass the gaseous refrigerant therethrough and closing the same upon the initial movement of said piston so as to render the pressure of the gaseous refrigerant effective upon the head of the piston-cylinder and, combined with the pressure of the said liquid refrigerant upon said piston, sufficient to force the relatively strong liquid refrigerant solution from the said cylinder area of said piston-cylinder to the generator.

2. In a refrigerating apparatus, the combination of: a generator; an absorber; an evaporator; a pump comprising a body having coaxial, interconnecting cylinders one of which is provided at its head end with an inlet for the relatively weak liquid refrigerant solution flowing from the generator into the absorber; the other of said cylinders having an inlet at its head end for the gaseous refrigerant flowing from the evaporator into the absorber; a piston in the first-named cylinder and a piston-cylinder in the second-named cylinder having a cylinder portion provided with a passage functioning as an inlet thereinto for the relatively strong liquid refrigerant solution from the absorber and also as an outlet for the same to the generator; said piston-cylinder having a by-pass passage formed therein opening at one end upon the upper surface of the same and at its other end upon the external surface thereof; and a valve between the said piston and piston-cylinder opening said passage in the idle position of the parts so as to by-pass the gaseous refrigerant therethrough and closing the same upon the initial movement of said piston so as to render the pressure of the gaseous refrigerant effective upon the head of the piston-cylinder and, combined with the pressure of the said liquid refrigerant upon said piston, sufficient to force the relatively strong liquid refrigerant solution from the said cylinder area of said piston-cylinder to the generator; said valve comprising a valve head formed in one of said pistons and a valve seat formed in the other of said pistons.

3. In a refrigerating apparatus, the combination of: a generator; an absorber; an evaporator; a pump comprising a body having coaxial, interconnecting cylinders one of which is provided at its head end with an inlet for the relatively weak liquid refrigerant solution flowing from the generator into the absorber; the other of said cylinders having an inlet at its head end for the gaseous refrigerant flowing from the evaporator into the absorber; a piston in the first-named cylinder and a piston-cylinder in the second-named cylinder having a cylinder portion provided with a passage functioning as an inlet thereinto for the relatively strong liquid refrigerant solution from the absorber and also as an outlet for the same to the generator; said piston-cylinder having a by-pass passage formed therein opening at one end upon the upper surface of the same and at its other end upon the external surface thereof; and a valve between the said piston and piston-cylinder opening said passage in the idle position of the parts so as to by-pass the gaseous refrigerant therethrough and closing the same upon the initial movement of said piston so as to render the pressure of the gaseous refrigerant effective upon the head of the piston-cylinder and, combined with the pressure of the said liquid refrigerant upon said piston, sufficient to force the relatively strong liquid refrigerant solution from the said cylinder area of said piston-cylinder to the generator; said valve comprising a valve seat formed in the head of said piston-cylinder and a valve head formed in said piston.

4. In refrigerating apparatus, the combination of: a generator; an absorber; an evaporator; means for circulating the relatively strong refrigerant liquor from the absorber to the generator; said circulating means including a valve co-acting therewith to combine upon said circulating means the effective pressure of the relatively weak refrigerant liquor entering the absorber from the generator with the pressure of the refrigerant gas entering the absorber from the evaporator, so as to render both of said pressures, when combined, effective to operate said circulating means and thereby circulate the relatively strong refrigerant liquor from the absorber back into the generator.

5. In refrigerating apparatus, the combination of: a generator; an absorber; an evaporator; means comprising a pump, including a piston, for circulating the relatively strong refrigerant liquor from the absorber to the generator; means for resetting said pump piston into initial position after each operation thereof, and said resetting means offering resistance to the movement of the said pump piston into effective position; and means co-acting with said pump piston to combine upon the latter the effective pressure of the relatively weak refrigerant liquor entering the absorber from the generator with the pressure of the refrigerant gas entering the absorber from the evaporator, so as to move said pump piston into effective position against the combined resistances of its said resetting means and of the relatively strong refrigerant liquor circulated thereby from the absorber back to the generator.

6. In refrigerating apparatus, the combination of: a generator; an absorber; an evaporator; means comprising a pump, including a piston, for circulating the relatively strong refrigerant liquor from the absorber to the generator; a spring for resetting the said pump piston into initial position after each operation thereof and said spring offering resistance to the movement of the said piston into effective position; said pump including a device co-acting therewith to combine upon the said piston of said pump the effective pressure of the relatively weak refrigerant liquor entering the absorber from the generator with the pressure of the refrigerant gas entering the absorber from the evaporator so as to move said pump piston against the combined resistances of its said resetting spring and of the relatively strong refrigerant liquor circulated thereby from the absorber back to the generator.

7. In refrigerating apparatus, the combination of: a generator; an absorber; an evaporator; and a pump for circulating the relatively strong refrigerant liquor from the absorber back into the generator; said pump comprising a body having inter-communicating co-axial cylinders; one of said cylinders being provided at its head end with an inlet for the relatively weak refrigerant liquor entering the absorber from the generator and the other of said cylinders being provided at its head end with an inlet for the refrigerant gas entering the absorber from the evaporator; a piston in the first named cylinder and a piston-cylinder in the second named cylinder; said piston-cylinder being provided with a by-pass leading to the external surface of said piston-cylinder; said body having a passage formed therein providing a fluid inlet into, and a fluid outlet out of, the cylinder portion of said piston-cylinder; means co-acting upon the said piston-cylinder with the relatively strong refrigerant liquor in the cylinder portion thereof to resist pumping movement of said piston and piston-cylinder; and a valve between said piston and piston-cylinder; said valve being open in the normal or idle position of said piston and piston-cylinder and in this position acting to shunt the refrigerant gas from the evaporator through said by-pass and out of the second named cylinder: but said valve closing upon the initial movement of said piston and thus causing the pressure of the refrigerant gas entering the absorber from the evaporator to become effective upon the head of the said piston-cylinder whereupon the combined pressures of the refrigerant gas entering the absorber from the evaporator and of the relatively weak refrigerant liquor entering the absorber from the generator overcome the resistance of said resisting means and the resistance of the relatively strong refrigerant liquor in the cylinder portion of said piston-cylinder to force said relatively strong refrigerant liquor from the cylinder area of said piston-cylinder out of the same by way of said outlet to the generator.

8. In refrigerating apparatus, the combination of: a generator; an absorber; an evaporator; and a pump for circulating the relatively strong refrigerant liquor from the absorber back into the generator; said pump comprising a body having inter-communicating co-axial cylinders; one of said cylinders being provided at its head end with an inlet for the relatively weak refrigerant liquor entering the absorber from the generator and the other of said cylinders being provided at its head end with an inlet for the refrigerant gas entering the absorber from the evaporator; a piston in the first named cylinder and a piston-cylinder in the second named cylinder; said piston-cylinder being provided with a by-pass leading to the external surface thereof; said body having a passage formed therein providing a fluid inlet into, and a fluid outlet out of, the cylinder portion of said piston-cylinder; means co-acting upon the said piston-cylinder with the relatively strong refrigerant liquor in the cylinder portion thereof to resist pumping movement of said piston and piston-cylinder; and a valve between said piston and piston-cylinder; said valve being open in the normal or idle position of said piston and piston-cylinder and in this position acting to shunt the refrigerant gas from the evaporator through said by-pass and out of the second named cylinder, but said valve closing upon the initial movement of said piston and thus causing the pressure of the refrigerant gas entering the absorber from the evaporator to become effective upon the head of the said piston-cylinder whereupon the combined pressures of the refrigerant gas entering the absorber from the evaporator and of the relatively weak refrigerant liquor entering the absorber from the generator overcome the resistance of said resisting means and the resistance of the relatively strong refrigerant liquor in the cylinder portion of said piston-cylinder to force said relatively strong refrigerant liquor from the cylinder area of said piston-cylinder out of the same by way of said outlet to the generator; said valve comprising a valve head formed in one of said pistons and a valve seat formed in the other of said pistons.

9. In refrigerating apparatus, the combination of: a generator; an absorber; an evaporator; and a pump for circulating the relatively strong refrigerant liquor from the absorber back into the generator; said pump comprising a body having inter-communicating co-axial cylinders; one of said cylinders being provided at its head end with an inlet for the relatively weak refrigerant liquor entering the absorber from the generator and the other of said cylinders being provided at its head end with an inlet for the refrigerant gas entering the absorber from the evaporator; a piston in the first named cylinder and a piston-cylinder in the second named cylinder; said piston-cylinder being provided with a by-pass leading to the external surface thereof; said body having a passage formed therein providing a fluid inlet into, and a fluid outlet out of, the cylinder portion of said piston-cylinder; means co-acting upon the said piston cylinder with the relatively strong refrigerant liquor in the cylinder portion thereof to resist pumping movement of said piston and piston-cylinder; and a valve between said piston and piston-cylinder; said valve being open in the normal or idle position of said piston and piston-cylinder and in this position acting to shunt the refrigerant gas from the evaporator through said by-pass and out of the second named cylinder, but said valve closing upon the initial movement of said piston and thus causing the pressure of the refrigerant gas entering the absorber from the evaporator to become effective upon the head of the said piston-cylinder, whereupon the combined pressures of the refrigerant gas entering the absorber from the evaporator and of the relatively weak refrigerant liquor entering the absorber from the generator overcome the resistance of said resisting means and the resistance of the relatively strong refrigerant liquor in the cylinder portion of said piston-cylinder to force said liquor from the cylinder area of said piston-cylinder out of the same by way of said outlet to the generator; said valve comprising a valve seat formed in the head of said piston-cylinder and a valve head formed in said piston.

10. In refrigerating apparatus, the combination of: a generator; an absorber; an evaporator; and a pump for circulating the relatively strong refrigerant liquor from the absorber back into the generator; said pump comprising a body having an inlet for the relatively weak refrigerant liquor entering the absorber from the generator and having an outlet for the relatively strong refrigerant liquor passing from the absorber to the generator; a cylinder having an inlet for the refrigerant gas entering the absorber from the evaporator; a piston in said cylinder having a passage formed therein for conducting the said refrigerant gas therethrough from the said inlet of said cylinder; said piston having a valve seat formed in the said passage; a valve stem slidably arranged in said passage having a valve head formed thereon between its ends and upon the upper side of said piston; means coacting upon said piston with the relatively strong refrigerant liquor to resist movement of the said piston in a direction to force the relatively strong refrigerant liquor from the absorber to the generator; said valve stem engaging the upper wall of said cylinder at the inception of the pumping or work stroke of said piston so as to engage said head upon said seat and render the pressure of the refrigerant gas from the evaporator effective upon said piston; and said valve stem engaging the bottom wall of said cylinder at the end of the pumping or work stroke of the piston so as to disengage said valve head from its said seat and allow the refrigerant gas from the evaporator to flow through said by-pass without operating said piston.

ANDREW FLUKES.